(12) United States Patent
Kuhn

(10) Patent No.: US 9,062,814 B2
(45) Date of Patent: Jun. 23, 2015

(54) DEVICE, KIT AND METHOD FOR ANCHORING AN ELEMENT ON AN EXTERIOR FACE OF A WALL OF A BUILDING

(75) Inventor: Jean-Pierre Kuhn, Strasbourg (FR)

(73) Assignee: France Telecom, Paris (FR)

(*) Notice: Subject to any disclaimer, the term of this patent is extended or adjusted under 35 U.S.C. 154(b) by 43 days.

(21) Appl. No.: 13/702,675

(22) PCT Filed: Jun. 7, 2011

(86) PCT No.: PCT/FR2011/051287
§ 371 (c)(1),
(2), (4) Date: Dec. 7, 2012

(87) PCT Pub. No.: WO2011/154653
PCT Pub. Date: Dec. 15, 2011

(65) Prior Publication Data
US 2013/0206939 A1 Aug. 15, 2013

(30) Foreign Application Priority Data
Jun. 8, 2010 (FR) ...................................... 10 54505

(51) Int. Cl.
*E04C 2/52* (2006.01)
*F16M 13/02* (2006.01)
*H02G 3/22* (2006.01)
(Continued)

(52) U.S. Cl.
CPC ............ *F16M 13/02* (2013.01); *Y10T 29/49826* (2015.01); *H02G 3/22* (2013.01); *H02G 7/056* (2013.01); *F16B 13/00* (2013.01)

(58) Field of Classification Search
CPC .......... F16M 13/02; F16B 13/00; H02G 3/22; H02G 7/056; Y10T 29/49826
USPC .......... 52/220.8, 700, 713, 745.21, 426, 166, 52/125.2, 562; 182/229; 411/338, 400
See application file for complete search history.

(56) References Cited

U.S. PATENT DOCUMENTS 3,269,679 A 8/1966 Grappo
5,174,077 A * 12/1992 Murota .......................... 52/232
(Continued)

FOREIGN PATENT DOCUMENTS

FR 2783646 A1 3/2000

OTHER PUBLICATIONS

French Search Report dated Sep. 29, 2010 for corresponding French Patent Application No. 1054505 filed Jun. 8, 2010.
(Continued)

*Primary Examiner* — Brian Glessner
*Assistant Examiner* — Brian D Mattei
(74) *Attorney, Agent, or Firm* — David D. Brush; Westman, Champlin & Koehler, P.A.

(57) ABSTRACT

A device, kit, and method are provided for anchoring an element on an exterior face of a wall of a building. The method includes, from the inside of the wall, running a line into a hole passing through the wall and fixing said line to an element anchoring device. The device comprising a fastener of said element, a bearing means, a first fixing means and a guide able to guide a second fixing means that collaborates with said first means. The method includes, from the inside, pulling said line in order to introduce the guide into said hole and, from the inside and using the guide, fixing the two fixing means together to press the bearing means firmly against the exterior face of the wall.

20 Claims, 8 Drawing Sheets

(51) Int. Cl.
*H02G 7/05* (2006.01)
*F16B 13/00* (2006.01)

(56) References Cited

U.S. PATENT DOCUMENTS

| | | | | |
|---|---|---|---|---|
| 5,444,603 | A * | 8/1995 | Otsuka et al. | 362/549 |
| 5,447,400 | A | 9/1995 | Seymour | |
| 5,497,592 | A * | 3/1996 | Boeshart | 52/699 |
| 5,761,874 | A * | 6/1998 | Hayakawa | 52/701 |
| 6,779,316 | B2 * | 8/2004 | Carroll | 52/698 |
| 2008/0307736 | A1 * | 12/2008 | Trimmer | 52/426 |

OTHER PUBLICATIONS

International Search Report and English Translation of the Written Opinion of the International Searching Authority dated Feb. 27, 2012 for corresponding International Patent Application No. PCT/FR2011/051287 filed Jun. 7, 2011.

International Search Report dated Feb. 27, 2012 for corresponding International Application No. PCT/FR2011/051287, filed Jun. 7, 2011.

* cited by examiner

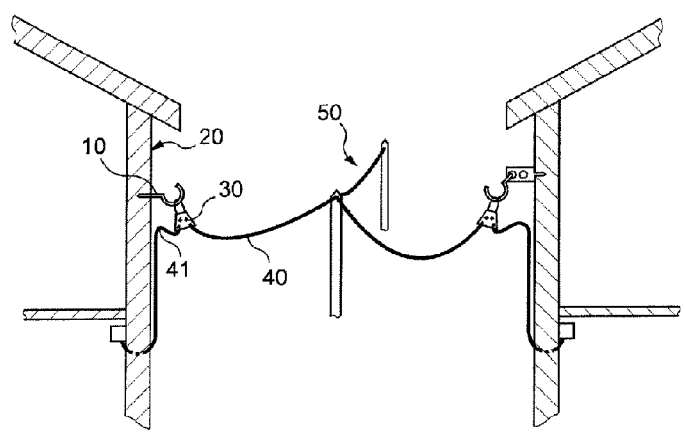
Fig. 1
(PRIOR ART)
Fig. 4
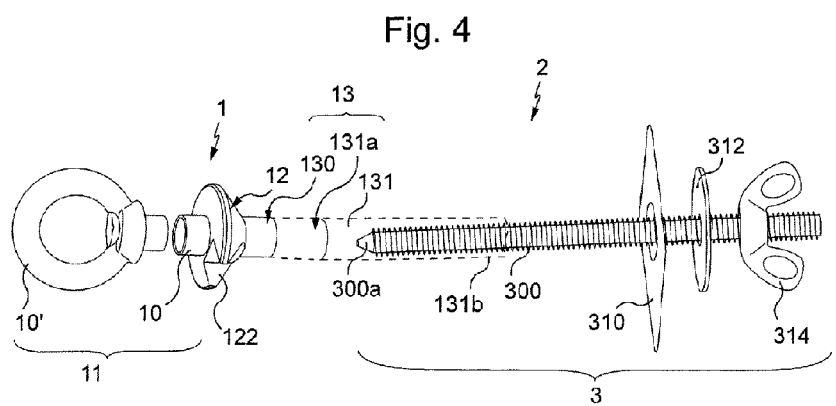

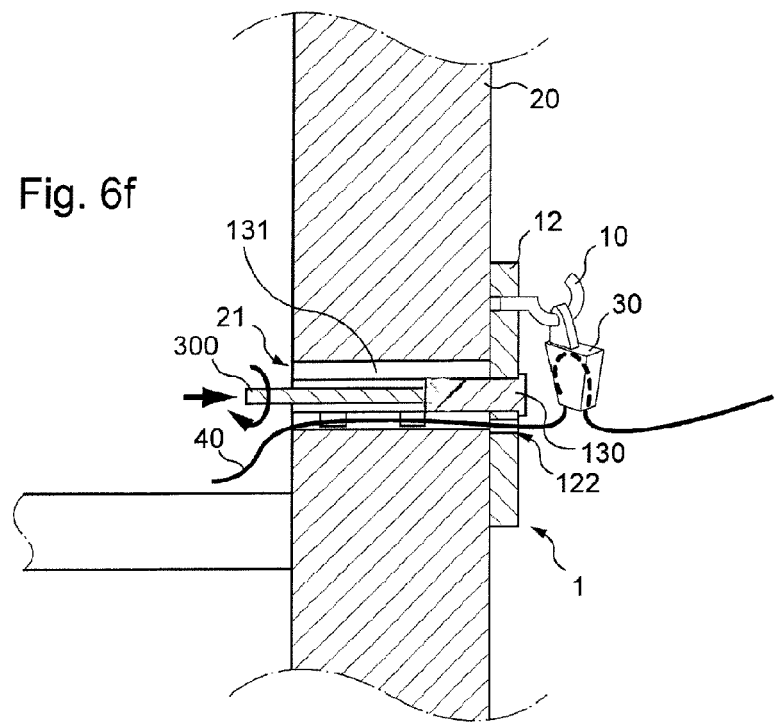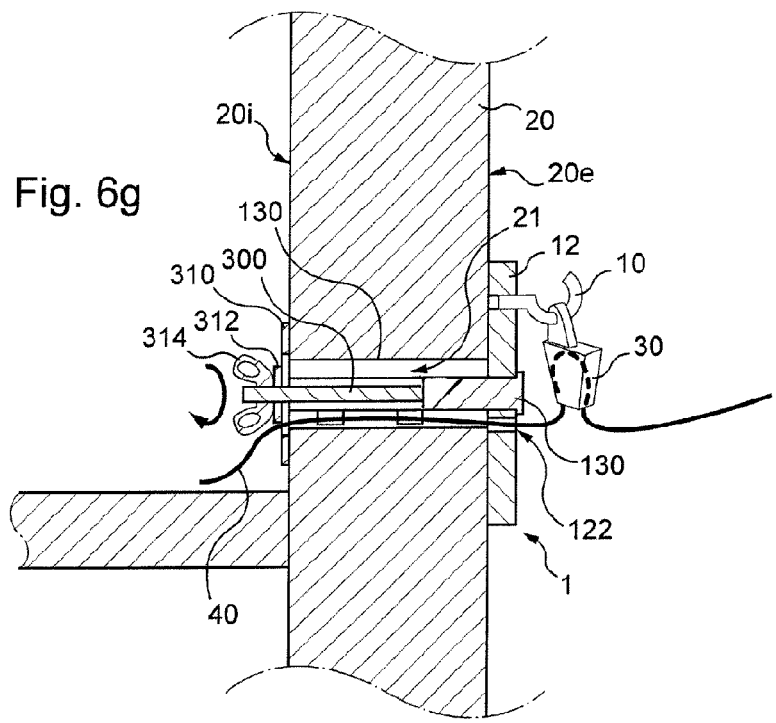

DEVICE, KIT AND METHOD FOR ANCHORING AN ELEMENT ON AN EXTERIOR FACE OF A WALL OF A BUILDING

CROSS-REFERENCE TO RELATED APPLICATIONS

This Application is a Section 371 National Stage Application of International Application No. PCT/FR2011/051287, filed Jun. 7, 2011, which is incorporated by reference in its entirety and published as WO2011/154653 on Dec. 15, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to a device, a kit and an anchoring process of an element on an external face of a wall of a building.

It applies especially to anchoring of aerial cables, such as telephone or electrical cables, on the external face of a building of a subscriber, but also to installation of any type of device (surveillance camera, projector, etc.).

However, an embodiment of the invention will mainly be illustrated in the context of a public telephone network where the terminal part of the network comprises aerial cables fixed to poles. The physical connection of a subscriber to this aerial network comprises deploying a subscriber cable from one of the poles to the interior of the dwelling of the subscriber.

BACKGROUND OF THE DISCLOSURE

Engineering rules provided for connecting a subscriber to the public network comprise especially anchoring of the cable on the external face of a wall of a building of the subscriber.

As illustrated schematically in FIG. 1, the conventional techniques for anchoring aerial cables, such as mentioned in publications FR 2 783 646 and WO 2006/125783, comprise a fixing hook 10 which is fixed directly to an external face of a wall 20 of a building and therefore turned towards the outside, and which supports a tensioner 30 for a telephone cable 40. This tensioner 30 maintains substantially constant tension on the subscriber aerial cable 40 towards the pole of the public network 50.

Fixing the hook 10 by an operator on the external face of the building is generally done by means of nacelles, allowing the operator to access the high parts of the external face of the building.

Because of the tensioner 30, the subscriber cable 41 downstream of the latter is devoid of tension stress. Therefore, because of the tensioner 30, it is possible to deport penetration of this cable 41 inside the dwelling, for example by having it run along the external face of the building as far as the point where the cable 41 enters the building.

This enables the anchoring point to be dissociated from the penetration point to allow anchoring when the penetration point is not appropriate for anchoring. In this case, the cable 41 is different to the cable 40 (for example a cable 41 less visible on the wall, especially white or beige, while the cable 40 is especially a cable whereof the exterior is black neoprene). An external housing containing the connection of these two cables 40 and 41 is necessary to create a cutting point with the additional risk of transmission problems.

Such interventions in the high parts of external faces of buildings prove to be delicate and dangerous, especially in the event of bad weather.

In addition, in some configurations, access to the high parts of the external face of a building is not possible: external face too far away, nacelle or ladder too short, loose soil, obstacle in front of the external face of the building, etc. In this case, it is not always possible to access placements required for fixing the anchoring hook or placements required for running the cable through.

Using more sophisticated access means, such as scaffolding, truck nacelle with large offset or operators rappelling from the roofs proves to be excessively costly and time-consuming (deployment, intervention and stowage).

Finally, even if the external face of a building is accessible, it is not always possible to access the ideal fixing placement: fixing as high as possible, in a discrete position, etc.

SUMMARY

In general, there is a need to improve anchoring techniques of an element on an external face of a building, whether of telephone cable type or other device.

For this purpose, an embodiment of the present invention especially proposes an anchoring device of an element on an external face of a wall of a building, comprising an external part fitted with retaining means of said element and intended to be turned towards the outside, characterised in that it comprises:

an intermediate part comprising support means on said external face;

an internal part capable of being inserted in a through-hole said wall, and said internal part comprises first partial fixing means and guide means capable of being inserted in said through-hole for guiding second partial fixing means passing through said wall and capable of cooperating with said first partial fixing means.

The device according to an embodiment of the invention enables the anchoring on an external face of a wall of a building to be installed more easily at any point whatsoever. This ease of installation is obtained by the combined presence of the first partial fixing means and of the associated guide means which jointly help fix the anchoring from the interior of the dwelling defined by said external face of a building. In fact, the guide means ensure easy fixing (for example by screwing) "blind" in the through-hole, of the second partial fixing means to the first partial fixing means.

The intermediate part ensures support against the external face of the building, especially by being pressed against the latter during cooperation of the two partial means for fixing. Therefore intervention directly on the exterior of the external face of the building is avoided.

In an embodiment, said guide means comprise a tube whereof an end is coaxial to said first partial fixing means. The use of a tube for guiding the second partial fixing means (for example a threaded rod) proves extremely effective, as much due to its simplicity in design as its capacity to precisely guide these second partial fixing means because its end (side anchoring device) is aligned (coaxial) with the first partial fixing means.

In particular, said tube has a length at least equal to the thickness of said wall at the level of said through-hole. This arrangement simplifies operations for the person installing the device, as it visually involves guiding by the tube. Any surplus of tube of the inner side of the wall will be removed, especially by excision, to ensure proper fixing on the inside.

According to a characteristic of an embodiment of the invention, said intermediate part comprises an opening arranged for the passage of a cable. This arrangement especially capitalises on the through-hole to run a cable through, for example a telephone cable or a supply cable of the element to be anchored on the external face of a building. Therefore, penetration of the cable is not offset relative to the anchoring point, and an external connection is no longer necessary, reducing both cutting and transmission problems.

In particular, the anchoring device comprises fixing means of said cable. By making the cable solid with the anchoring device, this cable can be used when run into the through-hole for pulling the anchoring device against the external face of a building with a view to fixing it in place.

In particular, the anchoring device comprises joining means of said cable to said guide means, substantially at the height of said first partial fixing means. This arrangement guarantees that when the anchoring device is pulled by means of said cable, the first partial fixing means are aligned with the through-hole. Therefore, fixing the device by means of the second partial fixing means is made easier. According to a characteristic of an embodiment of the invention, said retaining means are substantially coaxial to said first partial fixing means. Therefore, this creates alignment of the through-hole with the partial fixing means and the retaining means. The result especially is better compactness of the anchoring device, and therefore reduced occupation of the external face of a building.

According to another characteristic of an embodiment of the invention, said intermediate part has a width greater than that of the internal part such that when the device is fixed said intermediate part is pressed against said external face of the wall. In this case in particular, the through-hole has an intermediate cross-section between these two widths. When the second partial fixing means are also maintained of the inner side of the wall by support on the latter, this guarantees solid fixing of the anchoring device, via holdfast on either side of the wall.

According to another characteristic, said intermediate part is inclinable relative to a unit formed by internal and external parts. Therefore, the device according to an embodiment of the invention can be adapted to the irregularities of the external face of a building or to any oblique borings of the through-hole in which the internal part must be engaged.

In an embodiment, the device comprises a rigid portion extending from a support zone comprising said support means of the intermediate part, the rigid portion having dimensions adapted to introduction in said through-hole and automatically blocking said device in the through-hole when lateral force is applied to it. This mechanical autoblocking mechanism ensures that the anchoring device is held in place and therefore reduced deterioration of the latter and of the external face of the wall when lateral forces (wind, cable tension) are applied to the device.

An embodiment of the invention also relates to a kit comprising an anchoring device such as described hereinabove and second partial fixing means capable of cooperating with said first partial fixing means, so as to press said intermediate part against the external face of the wall.

This kit has the same advantages as the anchoring device, specifically especially enabling installation of the latter from the inner side of the wall of a building.

In particular, the first and second partial fixing means form a nut-screw system. This preferably is a threaded rod engaging in a nut solid with the anchoring device. Of course, the inverse is also possible. The fixing system of nut-screw type proves simple to implement and precise even blind when used with guiding means.

According to a particular characteristic, the final end of the partial fixing means of screw type (for example a threaded rod) capable of cooperating with the other partial fixing means of nut type is devoid of threading. The threading terminal of the threaded rod can be eliminated by filing the end of the rod to a bevel or rounding it, for example.

This end devoid of threading constitutes complementary guiding means of the threaded rod in the corresponding nut. In fact, the non-threaded part can engage in the nut without the need for screwing.

Therefore, this arrangement improves guiding and therefore engagement of cooperating means for fixing the anchoring device.

According to a characteristic of an embodiment of the invention, the second partial fixing means comprise, at an opposite end that cooperating with said first partial fixing means, adjustable support means arranged for providing support on an inner side of the wall which is opposite the support provided by said intermediate part against the external face of the wall. This arrangement ensures solid fixing of the anchoring device, via holdfast on either side of the wall.

Correlatively, an embodiment of the invention also relates to an anchoring process of an element on an external face of a wall of a building, the wall defining an inner side and an external side, characterised in that it comprises the following steps:

from the inner side of the wall, running a line into a through-hole of said wall;

fixing said line to an anchoring device of an element, the anchoring device comprising retaining means of said element, support means, first partial fixing means and guide means capable of guiding second partial fixing means arranged to cooperate with said first partial means;

from the inner side, pulling said line so as to introduce at least said guide means in said through-hole maintaining the retaining means and the support means of the external side;

from the inner side and by means of said guide means, fixing said second partial fixing means to said first fixing means so as to press said support means against the external face of the wall and have said retaining means turned towards the outside.

According to the applications hereinbelow, the term "line" combines any type of wire, rope, cord or cable or equivalent, especially single cords, electrical cables/cords/wires and telephone cables. According to an embodiment of the invention, the purpose of the "line" is to pull a unit of elements (here the anchoring device) to be fixed to the latter, in the manner of a "fishing line".

The anchoring process has advantages similar to those of the device and of the kit explained hereinabove, especially enabling anchoring of an element on an external face of a wall of a building from the inner side of the wall.

The process can optionally comprise steps relating to the characteristics of the device or of the kit explained previously.

In particular, the step for fixing the line attaches the line to the guide means substantially at the height of said first partial fixing means. After the anchoring device has been pulled against the external face of the building, this arrangement aligns the first partial fixing means with the through-hole. Therefore, fixing by means of the second partial fixing means is made easier.

In addition, it can be provided that the guide means comprise an end fixed to the anchoring device and an opposite end, and the fixing step of the line attaches the line to the guide means substantially at the level of the opposite end. This arrangement improves the introduction of the guide means in the through-hole when the line is pulled.

According to a characteristic of an embodiment of the invention, said element to be anchored comprises a cable, for example a supply cable or a telephone cable, and said line comprises said cable. In this configuration, the cable run in the through-hole is fixed to the element, then the cable of the element is used to pull the anchoring device to which said element is attached. In this way, the cable from the inner side of the wall has already been introduced, without any outside intervention after the anchoring, as is the case in known techniques. Therefore penetration of the cable is not offset relative to the anchoring point, and external connection is no longer necessary.

According to yet another characteristic of an embodiment of the invention, during pulling of said line, said first partial fixing means are introduced at least partially into said through-hole. This partial introduction especially focuses the first partial fixing means in the axis of the through-hole. Therefore, fixing by means of the second partial fixing means is made easier.

According to yet another characteristic of an embodiment of the invention, the process comprises fixing step of said second partial fixing means against the inner side of the wall. As mentioned previously, this can be done by clamping support means onto the inner side of the wall.

BRIEF DESCRIPTION OF THE DRAWINGS

Other particular features and advantages of an embodiment of the invention will emerge from the description hereinbelow, illustrated by the attached diagrams, in which:

FIG. 1 illustrates the anchoring of a telephone cable tensioner according to the prior art;

FIGS. 2 to 5 schematically illustrate different embodiments of an anchoring device and a kit according to an embodiment of the invention;

DETAILED DESCRIPTION OF ILLUSTRATIVE EMBODIMENTS

Figure 2:
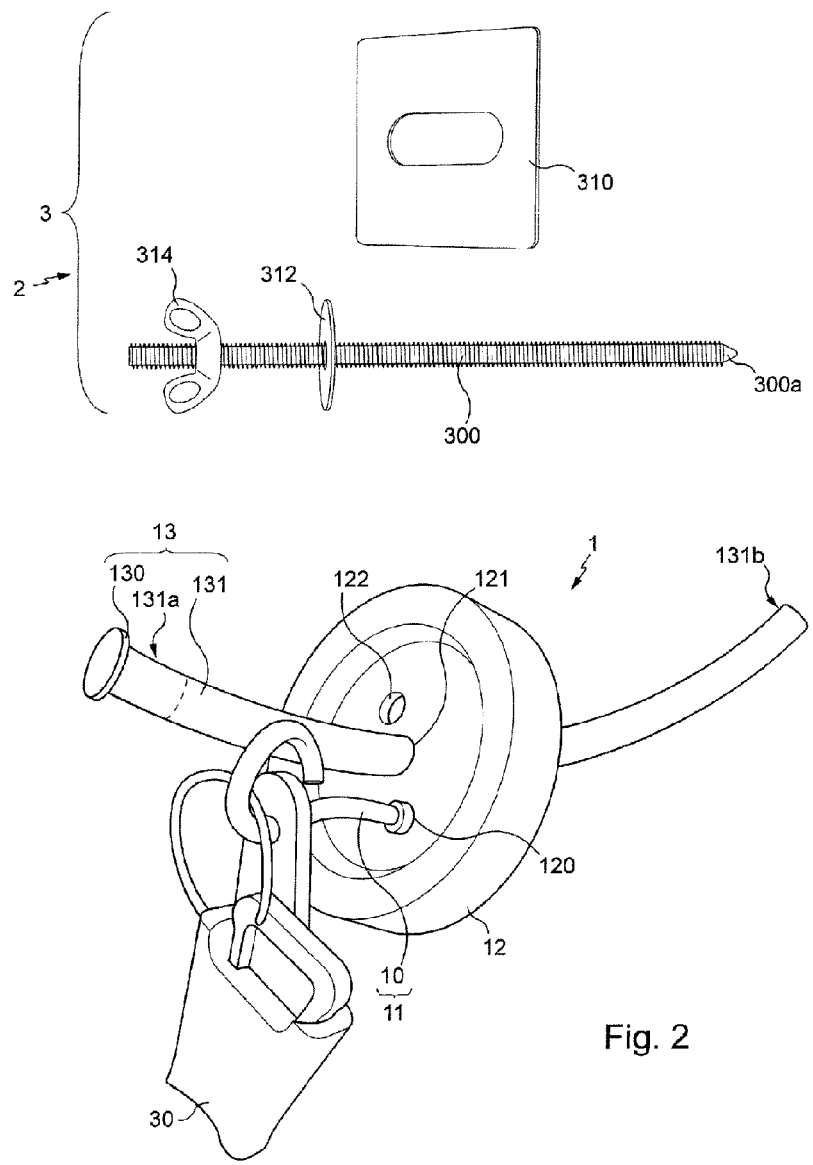

According to an embodiment of the invention, the anchoring of an element on an external face of a wall of a building, especially a dwelling, is done by means of an anchoring device fitted with retaining means of the element, support means for resting on the external face, first partial fixing means and guide means capable of guiding second partial fixing means arranged to cooperate with said first partial means.

The fixing of the anchoring device consists of using a wire or a cable hooked to the anchoring device and running through a through-hole the wall to bring back said anchoring device so as to introduce said guide means into the through-hole from the interior of the wall.

Therefore, from the inner side of the wall and by means of said guide means, said second partial fixing means can be fixed to said first fixing means to attach the support means against the external face of the wall, and therefore fix the anchoring device.

FIGS. 2 to 5 schematically illustrate different embodiments of an anchoring device 1 and a kit 2 according to an embodiment of the invention.

An anchoring kit 2 comprises an anchoring device 1 and complementary fixing means 3.

The anchoring device 1 comprises an external part 11 (to the left in the figures) fitted with retaining means 10 for attaching an element 30 to an external face of a wall of a building.

In an application for a telephone or electrical network, the element 30 to be attached can be a telephone or electrical cable tensioner. Other applications are possible, such as anchoring an electronic device (surveillance camera, projector, alarm detector, etc.) or placard, for example.

Figure 3:
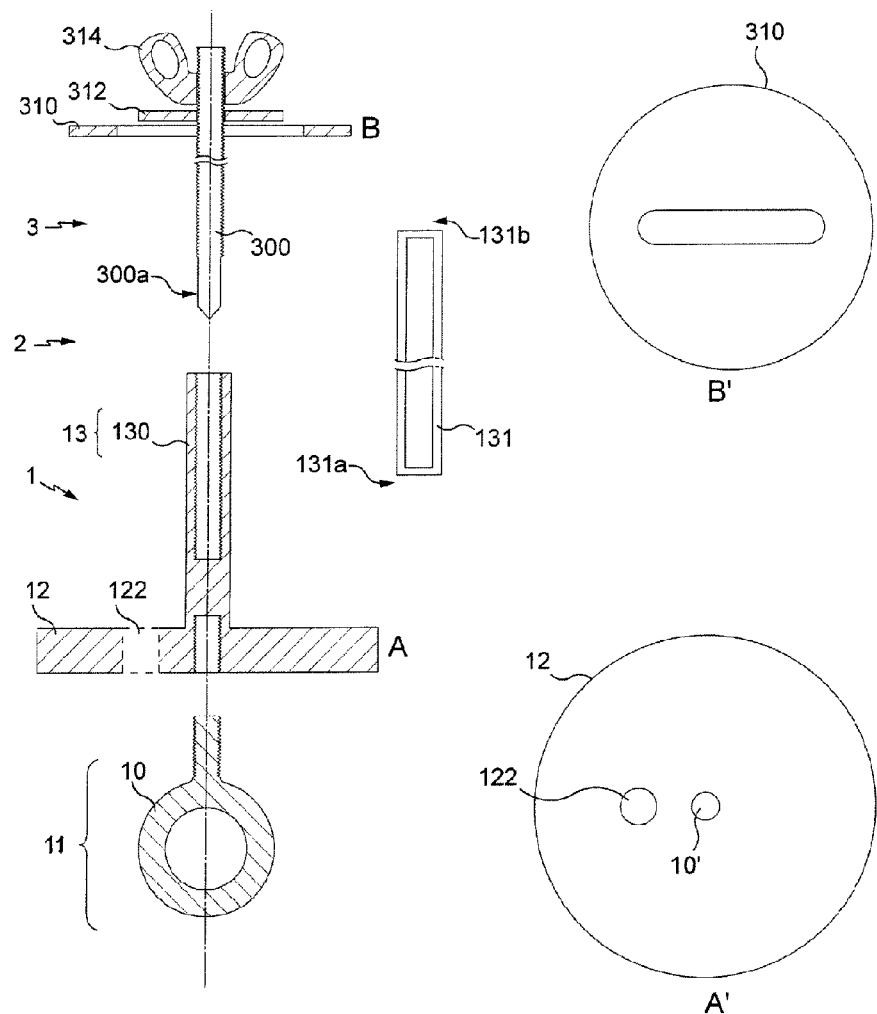

In FIGS. 2 and 3, the retaining means 10 take the form of a sufficiently closed hook or a ring screwed onto an intermediate part 12. In FIG. 4, these retaining means 10 take the form of a threaded nut on which a hook or a ring 10' can be screwed, or the element 30 to be anchored even directly. It should be noted that the hook or ring 10' can be welded directly onto the intermediate part 12 such as defined hereinbelow, and can comprise the retaining means 10.

The anchoring device 1 also comprises:
  an intermediate part 12 which is used as support surface on said external face of the building when the anchoring device is in fixed position, as described hereinbelow;
  an internal part 13 for fixing, in cooperation with the complementary fixing means 3, the anchoring device to the wall such that the retaining means 10 are positioned on the external face of the building.

In FIGS. 2 and 3, the intermediate part 12 is formed by a substantially plane mounting plate having dimensions much larger than those of the internal part 13.

The latter 13 is formed by a cap nut with flat head 130 and a supple tube 131, for example made of plastic.

The open end of the nut 130 is inserted by force into an end 131a of the tube 131. The nut 130 and the end 131a of the tube 131 are now coaxial. As described hereinbelow, this tube 130 serves as guide for guiding the complementary fixing means 3 in such a way that the latter cooperates with the nut 130 for fixing the anchoring device 1.

The tube 131 is especially of a length greater than the length of the through-hole of the wall and into which it will be introduced. As described hereinbelow, this visually engages the complementary fixing means 3 in the guide tube.

In FIG. 2, the mounting plate 12 comprises, substantially at its centre, at least two openings 120, 121 designed respectively for fixing the hook 10 and passage of the nut 130. The opening 121 for the passage of the nut is of a diameter less than the flat head of the nut 130 so as to block the latter. Therefore, in its use position the nut 130 and the tube 131 are substantially positioned to the side opposite the hook 10, that is, the internal part 13 of the device 1. In an application where the element to be fixed comprises a wire or cable, for example a supply or telephone line, a third opening 122 can be provided in the mounting plate to allow passage of the wire or cable.

In FIG. 3, the mounting plate 12 is made in a single piece with the cap nut 130, and in the alignment of said nut 130 and of the side opposite the latter has a cap nut 10' for receiving the ring 10. Likewise, in an application where the element to be fixed comprises a wire or cable, an opening 122 is provided in the mounting plate for passage of the wire or cable.

In FIG. 4, the internal part 13 is constituted by a cap nut 130 also capable of cooperating with the complementary fixing means 3, and a flexible tube 131.

Figure 5:
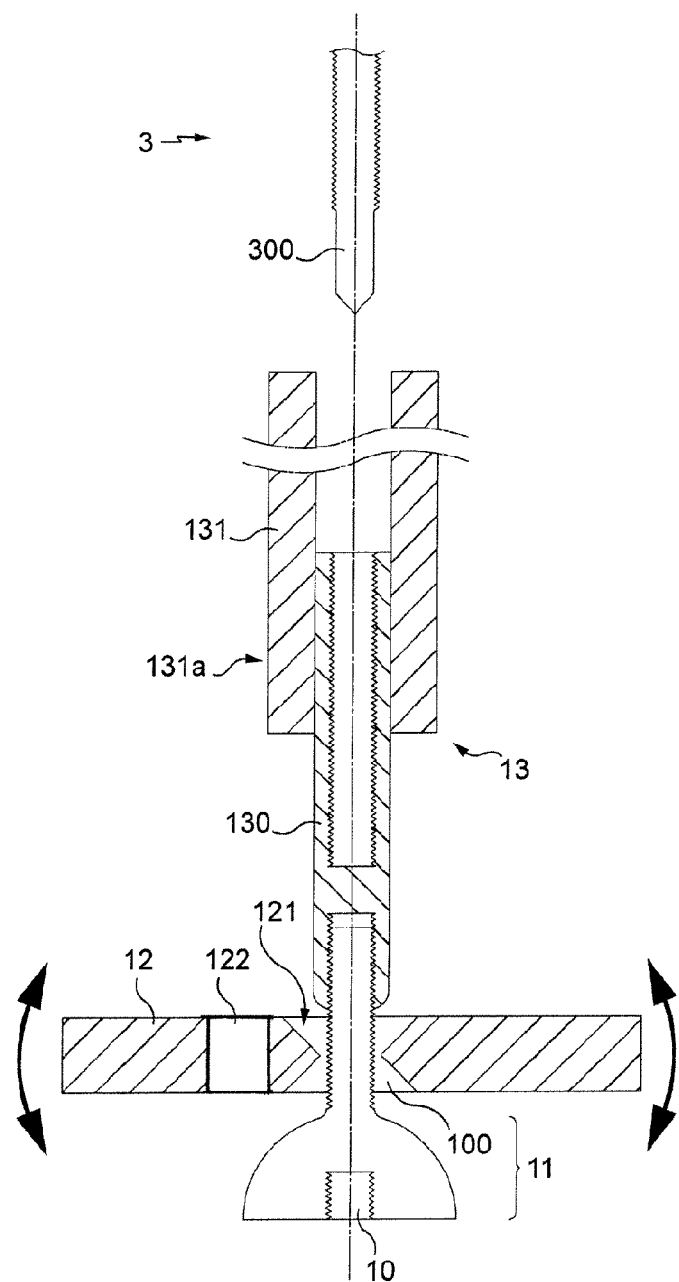

Similarly to FIGS. 2, 3 and 5, the nut 130 is introduced by force into the tube 131 in such a way that the end 131a and the nut 130 are coaxial for better guiding of the complementary fixing means 3.

The external 11 and internal 12 parts, as well as the cap nut 130, are formed by a single revolving part, especially made of metal, and are coaxial, resulting in considerable compactness of the anchoring device 1, similarly to FIG. 3.

The intermediate part 12 extends flared from the internal part 13. The intermediate part 12 therefore has a greater diameter than that of the internal part.

As described hereinbelow, this greater diameter uses the intermediate part 12 as a support surface against the external face of a building, during fixing of the anchoring device 1.

The conical (flared) form of the intermediate part 12 also offers centring capacity of the cap nut 130 when the internal part 13 is introduced in the through-hole of the wall of the building as described hereinbelow. By way of a variant however, the intermediate part 12 can have, on the lower side (that is, on the side of the internal part 13), a plane and no longer conical/flared surface (FIG. 3).

In an anchoring application of an electronic or electrical device equipped with a wire or cable, an opening or notch 122 provided for the passage of the wire or cable can be provided at the level of the intermediate part, as shown in Figure.

In the embodiment of FIG. 5, the retaining means 10 (cap nut) are placed in the centre of a hemisphere whereof the opposite part terminates in a threaded rod 100 running into the opening 121 of the mounting plate 12.

The cap nut 130 is fixed to this threaded rod 100, after its passage in the opening 121, the nut unit 130—retaining means 10 being free to rotate (ball-joint connection) relative to the mounting plate 12, especially because of the slightly bigger dimensions of the opening 121 relative to the threaded rod 100 and to the flared profile of the two sides of the opening 121, as shown in Figure. The opening 121 is made in particular in such a way that the cut of the opening 121 in the mounting plate 12 forms a "V" whereof the flared part rests against the external surface of the building.

When the anchoring device is fixed by clamping by means of the complementary fixing means 3, this configuration produces swinging relative to the mounting plate 12 relative to the unit 10-130 (see arrows in Figure), the spherical part of the retaining means 10 resting on the flared parts.

The resulting inclination of the mounting plate 12 offers better adaptation to surface irregularities of the external face of the building, and to any defects in alignment (oblique hole passing through the wall).

In the example of the figure, an opening 122 is also provided in the mounting plate 12 for the passage of a cable from the element to be attached to the interior of the dwelling.

Alternatively, the openings 121 and 122 communicate to form one and the same opening. Therefore, the inclination of the mounting plate 12 relative to the unit 10-130 is facilitated in the axis formed by the communicating openings 121 and 122. In addition, this facilitates manufacture of a small-sized mounting plate 12 without calling into question the integrity of the mounting plate after passing of the unit 10-130 and passing of the pierced cable.

In the kits 2 of FIGS. 2 to 5, the complementary fixing means 3 comprise a threaded rod 300 used in an embodiment of the invention as complementary partial fixing means of the cap nut 130. These two partial fixing means are therefore provided to cooperate according to a nut-screw system, by running the threaded rod into the through-hole of the wall of the building.

Of course, in a variant, the internal part 13 can comprise a threaded rod end and the complementary fixing means 3 comprise an end of nut type capable of cooperating with the threaded rod end.

As shown in Figures, the rod 300 is devoid of threading on the terminal end 300a intended to cooperate with the nut 130. This allows previous engagement of the threaded rod 300 in the nut 130 prior to screwing, and therefore mechanical alignment of these two elements for better screwing. By way of illustration, for a cap nut of 4 to 6 cm in depth, the threading of the rod 300 can be eliminated over a length of 1.5 cm by filing to a bevel or rounded.

As a variant, the threading on the entire threaded rod 300 can however be kept.

The complementary fixing means 3 also comprise clamping elements of the threaded rod 300 by support against the inner side of the external face of a building. The threaded rod 300 being provided to pass through the through-hole the wall of the building, these clamping elements are provided opposite the end 300a.

These clamping elements can comprise a mounting plate 310 having an opening for passage of the threaded rod 300 and any wire or cable, a washer 312 of diameter greater than the opening and a nut of butterfly type 314 for tightening the washer and the mounting plate against the inner side of the wall, as seen hereinbelow.

Therefore, these clamping elements 310, 312, 314 lend support on the inner side of the wall which is opposite the support lent by said intermediate part 12 against the external face of the building. In this way, the anchoring device 1 is solidly fixed to the wall clamped in a holdfast on one side by the intermediate part 12 and on the other side by the mounting plate 310. To ensure sealing of the building, sealing means (not illustrated) such as sealing mousse can be placed between the intermediate part 12 and the external face of the building. In particular, these sealing means will be fixed to the intermediate part 12. The sealing means especially have mechanical expansion characteristics under mechanical pressure such that the sealing means fill the empty spaces between the intermediate part 12 and the external surface of the building and optionally part of the hole 21 passing through the wall 20 from this external surface of the building.

It is also evident that these clamping elements (and therefore unclamping) also make the anchoring device 1 removable, for example for maintenance operations or battery changes of the element which is attached thereto.

In reference now to FIG. 6, the anchoring process of a telephone cable 40 and a tensioner 30 is described, and especially the fixing process of the anchoring device 1 of an element to a wall 20 of a dwelling such that a connecting ring is arranged on the external face of the wall.

Figure 6A:
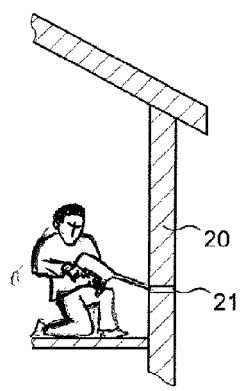
FIG. 6 schematically illustrate the different steps for implementing an embodiment of the invention to install an anchoring device according to any one of the embodiments of FIGS. 2 to 5.

In FIG. 6a, a hole 21 passing through the wall 20 is made from the interior of the dwelling, with respect to the precise place where the operator wants to position anchoring for a telephone cable tensioner. The average height of storeys in dwellings makes this boring simple to perform.

A hole of diameter 22 mm can be sufficient for a device 1 having a nut 130 and a tube 131 of diameters of around 15 mm. In general, the diameter of the hole 21 can be equal to the sum of the external diameters of the tube 131 and of the cable or wire 40, to which a margin, for example between 10 and 25%, especially 25%, is added for easy passage of the assembly into the hole 21.

It should be noted that such a boring could be made in advance during construction of the dwelling.

Figure 6B:
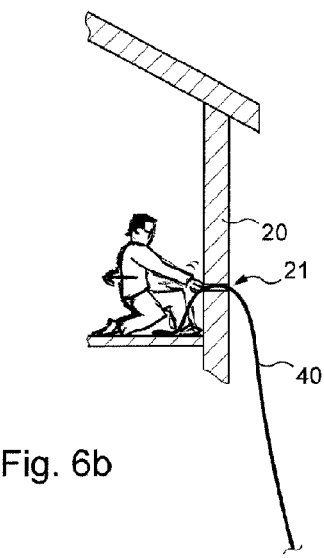

As shown in FIG. 6*b*, a telephone cable 40 is introduced into the hole 21, from the interior of the dwelling. Once the cable 40 passes through, it is retrieved outside to be fixed to the anchoring device 1 (FIG. 6*c*).

Figure 6C:
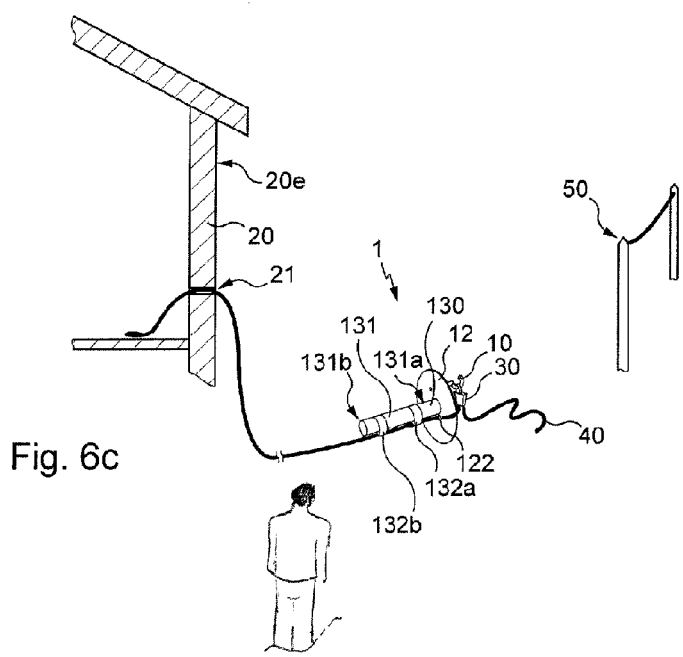

In the telephone network application, a long length of cable (useful length outside+external height to the ground) is run through the hole 21 to make its connection to the electrical pole 50 (FIG. 6*c*).

Of course, for applications where the element to be attached is not equipped with cable, any other type of line, such as a cord which is attached directly to the anchoring device 1, can be used.

As shown in FIG. 6*c*, the cable 40 is fixed to the anchoring device 1 outside, at the foot of the external face 20*e* of the building.

In particular, it is run into the opening 122, then into the tensioner 30 attached to the hook 10 of the device 1.

The cable 40 is also fixed directly to the anchoring device 1, here by the use of adhesive tape or other clamping rings solid with the device 1, which attach the cable 40 along the guide tube 131.

In particular, the cable 40 is first fixed to the tube 131 by means of adhesive tape 132*a* substantially at the height of the cap nut 130, and therefore of the end 131*a* of the tube. When the cable is pulled on to hoist and return the device 1 to the through-hole 21, this aligns the cap nut 130 with said hole 21.

In addition, the cable 40 is fixed to the end 131*b* of the tube 131 (by means of adhesive tape 132*b*) so a to guarantee during this same pulling easy introduction of the tube 131 to the hole 21.

At this stage, the element to be anchored (tensioner, camera, projector, etc.) is attached if necessary to the anchoring device 1 by means of the ring 10.

Figure 6D:
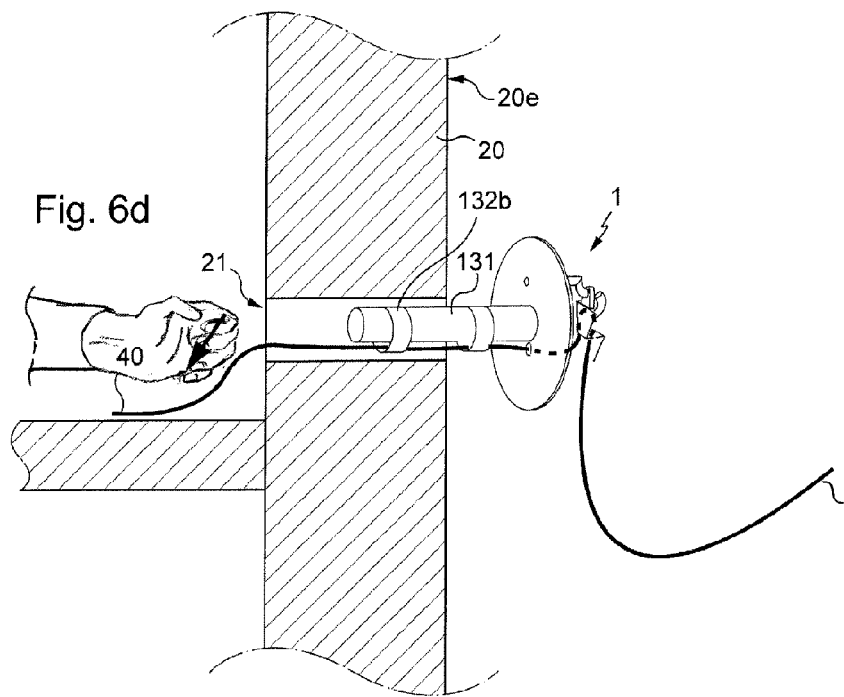
Figure 6E:
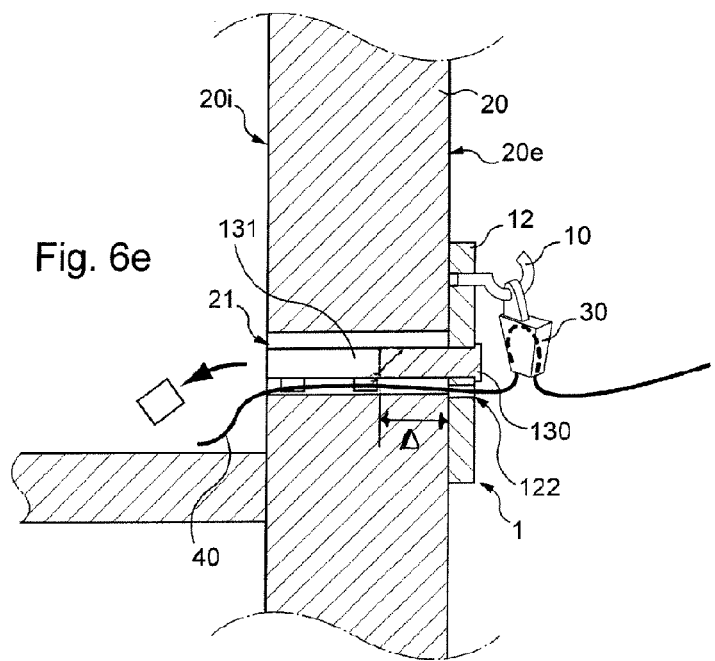

The following step consists therefore of pulling the cable 40 from the interior of the dwelling so as to hoist the anchoring device 1 with its element attached, and introduce the guide tube 131 to the through-hole 21 due to the adhesive tape 132*b* which pulls along its end 131*b* into the hole 21 (FIG. 6*d*).

The cap nut 130 (FIG. 6*e*) is also partially introduced by pulling until the intermediate part 12 of the device 1 is pressed against the external face 20*e* of the building.

The cap nut 130 can especially have a length (depth) of a few centimeters, between 4 and 6 cm. Therefore, once it is engaged in the hole 21, it is aligned with the latter, allowing easier screwing of the threaded rod 300, as mentioned hereinbelow.

In addition, the long length of the cap nut 130 imparts a high level of resistance to a lateral effort exerted on the hook 10 once the device 1 is affixed. This can be the case when, for example, the cable 40 is stretched to a pole laterally relative to the external face of a building 20.

In general, a rigid portion of the device 1 (at least part of the cap nut 130 and optionally part of the intermediate part 12) is introduced to the through-hole 21 over a sufficient length Δ for this portion to be blocked in the wall when lateral stress relative to the axis of the hole is applied to the device. In the telephone network application, when the cable is not facing the hole but is skimming (for example 30°) relative to the external face 20*e*, this allows the tension of the cable, once it is connected to a pole of the network, not to move or even extract the device in/from the wall.

For a wall fitted with an external coating of roughcast (for example 2 to 3 cm), the introduced portion (the rigid part which extends from the support surface on the external face 20*e*) can be of a length Δ greater than double the thickness of the roughcast, for example between 6 and 7 cm.

As a tube 131 of length greater than that of the through-hole 21 has been selected, the excess tube 131 which protrudes from the inner side 20*i* of the wall 20 (FIG. 6*e*) is cut.

Knowing the initial length of the tube 131 and the surplus removed shows especially fairly precisely the length of the threaded rod 300 which will be necessary for fixing the device 1, and therefore cutting the latter in advance.

In reference to FIG. 6*f*, the threaded rod 300 is introduced to the guide tube 131, holding the cable 40 to place the intermediate part 12 against the external face 20*e* of the building. The long length of the tube allows visual and therefore effective introduction.

The guide tube 131 slid onto the nut 130 introduces, blind, the end 300*a* of the rod 300 to the nut 130, then screws the threaded rod 300 in the nut 130, always blind.

Once screwing is completed, the anchoring device 1 is clamped and pressed against the external face 20*e* of the building (FIG. 6*g*) by means of the clamping elements 310, 312, 314. This operation solidly fixes the device 1 to the wall in such a way that the hook 10 is on the external face 20*e*, turned towards the outside and the tensioner 30 is also outside, in keeping with engineering rules.

As eventuates from this figure, fixing the anchoring device 1 consists of clamping the wall 20 in its thickness in a holdfast by means of the threaded rod 300 which presses the intermediate part 12 against the external face 20*e* of the wall and the mounting plate 310 against the inner side 20*i* of the wall.

If necessary, the excess threaded rod 300 from the inner side can be cut off.

Figure 6H:
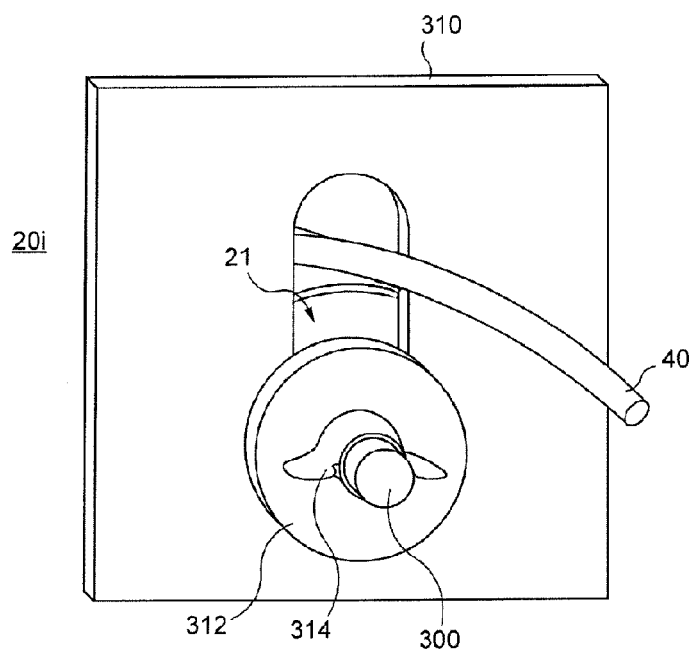

FIG. 6*h* shows front-on the mounting from the inner side 20*i*.

Once the device 1 is fixed, the cable 40 outside can be attached to the pole 50 of the telephone network.

FIG. 7 illustrates another example of an embodiment of the invention in which a camera must be anchored on the external face of a wall 20.

Figure 7A:
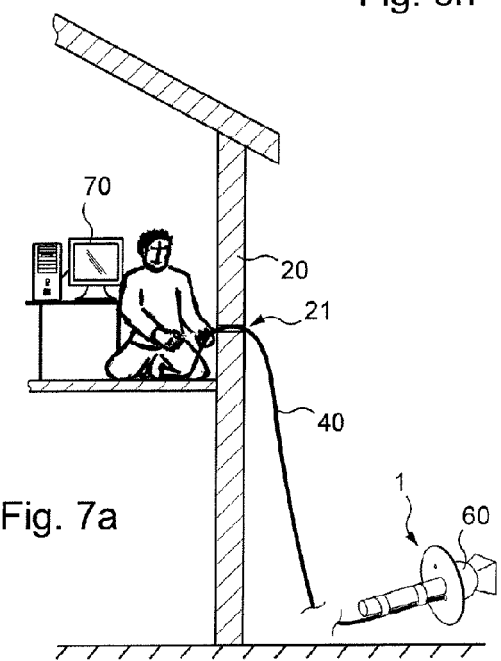
FIG. 7 illustrates application of an embodiment of the invention to the anchoring of a surveillance camera.
Figure 7B:
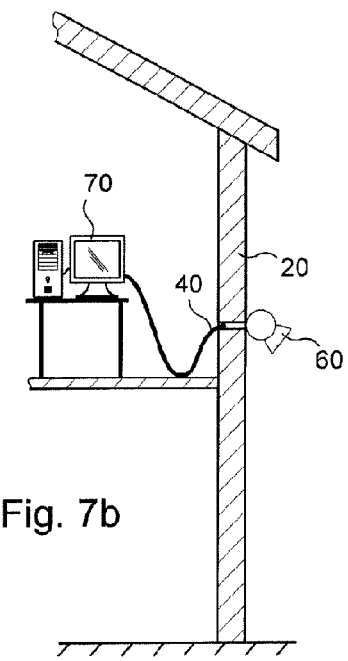

In FIG. 7*a* a cable 40 enabling connection of the camera 60 to a display and/or recording and/or transmission device 70 (for example a USB cable) is run through the hole 21 then secured to the anchoring device 1 to which the camera 60 is attached. ON the ground, the cable 40 is connected to the camera 60 and made solid with the anchoring device 1 similarly to what has been described in relation to FIG. 6.

If the cable 40 is not long enough, it can be extended by a cord. By applying the various operations previously described, an operator pulls on this cable 40 to bring the camera 60 back onto the external face of the wall 20 at the height of the hole 21, then fixes the anchoring device 1.

Once the unit is affixed (FIG. 7*b*), the cable 40 is connected to the device 70, offering a video surveillance function.

Therefore, as it emerges from the preceding, the installation of an anchoring according to an embodiment of the invention is completed mainly from the interior of the dwelling, with minimal outside intervention, which is only on the ground anyway.

In addition, an embodiment of the invention introduces the cable 40 to the dwelling at the same temps as the fixing of the device 1. There is no longer any need to carry out two distinct operations or to provide external connections between cables.

In addition, the final clamping elements 310, 312, 314 are reversible (unclamping possible), making the anchoring device 1 disassemblable and reusable.

An embodiment of the invention accordingly enables:
anchoring on the external face of a wall of a building in case of inaccessibility to the latter;
increasing the possibilities of anchoring at height or in zones difficult to access from the exterior;
reducing intervention costs by excluding ad hoc any equipment for accessing the high parts of an external face of a building, and reducing the duration of interventions;
boosting the safety of operators (no height intervention, or in bad weather);
facilitating interventions, especially maintenance or change of anchoring devices.

The anchoring according to an embodiment of the invention also presents substantial technical simplicity and is therefore low-cost, enabling its use for fixing any type of element, especially by private individuals.

The preceding examples are only embodiments of an embodiment of the invention and are not limited thereby.

In the above examples, even though the cable 40 equipping the element to be attached is used for hoisting and fixing the anchoring device 1, it is possible to employ a simple cord which is fixed to the anchoring device 1 or to said cable, before the whole is hoisted up.

In the event where the cord is fixed to the anchoring device 1, conventional techniques can be used to have the cable 40 arrive inside the dwelling (along walls and run through a penetration point).

Although the present disclosure has been described with reference to one or more examples, workers skilled in the art will recognize that changes may be made in form and detail without departing from the scope of the disclosure and/or the appended claims.

The invention claimed is:

1. An anchoring device for anchoring an element, comprising a cable, on an external face of a wall of a building, comprising:
an external part fitted with retaining means for retaining said element and turned towards the outside;
an intermediate part comprising support means for engaging said wall on said external face and an opening configured to pass the cable through the support means;
an internal part comprising first partial fixing means and guide means for passing through said through-hole from said external face of said wall;
second partial fixing means for passing through said through-hole from an internal face of said wall and cooperating with said first partial fixing means, said guiding means guiding said second partial fixing means to said first partial fixing means.

2. The anchoring device of claim 1, in which said guide means comprise a tube whereof an end is coaxial to said first partial fixing means.

3. The anchoring device of claim 1, wherein the device comprises joining means for joining said cable to said guide means, substantially at a height of said first partial fixing means.

4. The anchoring device of claim 1, in which said retaining means are substantially coaxial to said first partial fixing means.

5. The anchoring device of claim 1, in which said intermediate part is of a width greater than that of the internal part such that, when the device is fixed on said wall, said intermediate part is placed against said external face of the wall.

6. The anchoring device of claim 1, comprising a rigid portion extending from a support zone comprising said support means of the intermediate part, the rigid portion having dimensions adapted to introduction in said through-hole and to automatically block said device in the through-hole when lateral force is applied to it.

7. A kit comprising the anchoring device of claim 1 and the second partial fixing means capable of cooperating with said first partial fixing means so as to attach said intermediate part against the external face of the wall.

8. The kit of claim 7, in which the first and second partial fixing means form a nut-screw system.

9. The kit of claim 8, in which a final end of a screw of at least one of the first or second partial fixing means is devoid of threading.

10. An anchoring process for anchoring an element on an external face of a wall of a building, the wall defining an inner side and an external side, the anchoring process comprising:
from the inner side of the wall, passing a line through a hole passing through said wall;
fixing said line to an anchoring device of an element, the anchoring device comprising a retainer configured to retain said element, a support, a first partial fixing element and a guide;
from the inner side, pulling said line so as to introduce at least said guide in said through-hole, wherein the retainer and the support are maintained on the external side;
fixing, from the inner side and by using said guide, a second partial fixing element to said first partial fixing element so as to attach said support against the external face of the wall and have said retainer turned towards the outside.

11. The process as claimed in claim 10, in which said element to be anchored comprises a cable, and said line comprises said cable.

12. The process as claimed in claim 10, in which, during pulling of said line, said first partial fixing element is introduced at least partially in said through-hole.

13. An anchoring device for anchoring an element, comprising a cable, on an external face of a wall of a building, comprising:
an external part fitted with a retainer for said element and turned towards the outside;
an intermediate part comprising a support face, which faces said external face, and an opening configured to pass the cable through the support; and
an internal part comprising a first partial fixing element and a guide, which are capable of being inserted in a hole passing through said wall, from said external face;
a second partial fixing element, said second partial fixing element being configured to pass through said hole from an internal face of said wall and cooperating with said first partial fixing element, wherein the guide is configured to guide the second partial fixing element to the first partial fixing element.

14. The anchoring device of claim 13, in which said guide comprises a tube whereof an end is coaxial to said first partial fixing element.

15. The anchoring device of claim 13, wherein the device comprises a joining element configured for joining said cable to said guide, substantially at a height of said first partial fixing element.

16. The anchoring device of claim 13, in which said retainer is substantially coaxial to said first partial fixing element.

17. The anchoring device of claim 13, in which said intermediate part is of a width greater than that of the internal part such that, when the anchoring device is fixed on said wall, said intermediate part is placed against said external face of the wall.

18. The anchoring device of claim 13, comprising a rigid portion extending from a support zone comprising said support of the intermediate part, the rigid portion having dimensions adapted to introduce the support zone in said through-hole and to automatically block said anchoring device in the through-hole when lateral force is applied to the anchoring device.

19. The anchoring device of claim 13, in which the first and second partial fixing elements form a nut-screw system.

20. The anchoring device of claim 13, in which a final end of a screw of at least one of the first or second partial fixing elements is devoid of threading.

\* \* \* \* \*